United States Patent
Yamamura

[11] 3,781,862
[45] Dec. 25, 1973

[54] DISPLAY DEVICE FOR ELECTRONIC CALCULATOR

[75] Inventor: Katsumi Yamamura, Suwa, Japan

[73] Assignee: Kabushiki Kaisha Suwa Seikosha, Tokyo, Japan

[22] Filed: July 27, 1971

[21] Appl. No.: 166,383

[30] Foreign Application Priority Data
July 27, 1970 Japan.................................. 45/65034

[52] U.S. Cl......... 340/336, 340/324 R, 350/160 LC
[51] Int. Cl. ............................................. G09f 9/30
[58] Field of Search................. 350/160 R, 160 LC; 340/324 R, 336

[56] References Cited
UNITED STATES PATENTS
3,652,891  3/1972  Janning................ 340/336

*Primary Examiner*—John W. Caldwell
*Assistant Examiner*—Marshall M. Curtis
*Attorney*—Alex Friedman et al.

[57] ABSTRACT

A display device for an electronic calculator including a liquid crystal cell having a common electrode and a segmented electrode, the segments of said segmented electrode being adapted for selective separate actuation to produce the desired display in said liquid crystal cell. Diode means is coupled to each segment of said segmented electrode through the cathode thereof. Condenser means may also be coupled intermediate each of said segments of said segmented electrode and said common electrode.

8 Claims, 9 Drawing Figures

INVENTOR.
KATSUMI YAMAMURA

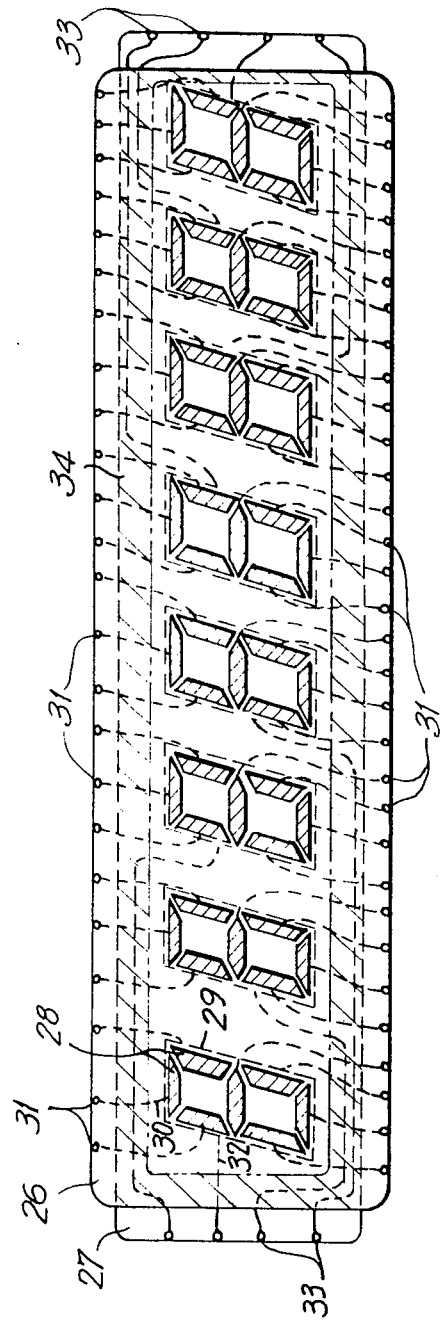

DISPLAY DEVICE FOR ELECTRONIC CALCULATOR

BACKGROUND OF THE INVENTION

This invention relates generally to display devices for electronic calculators utilizing liquid crystals as the display media, and in particular, to driving circuits for such display devices. Liquid are substances which cause a scattering of applied light in response to the application of a field thereacross. Both nematic type liquid crystals and liquid crystals incorporating a mixture of cholesteric and nematic type of liquid crystal materials may be utilized in the display device according to the invention.

A display cell utilizing liquid crystal as the display media offers substantial advantages over the prior art display devices such as the nixie tube and the Braun tube. Thus, a liquid crystal display cell consumes very small amounts of power, on the order of about 1 mw/cm$^2$. The thickness of the liquid crystal required for the display may be on the order of 20$\mu$. Further, liquid crystals permit a planar display, and may be produced at a low cost per display area. Still a further advantage of the liquid crystal display is that the brighter the environment, the more distinguishable and clearer the display.

However, liquid crystal displays were thought to offer substantial disadvantages which prevented their application to electronic calculators. Thus, the life of known liquid crystals is short, and liquid crystals cannot endure long application. Further, when liquid crystals were applied to displays, undesired segments were sometimes faintly lit due to the leakage of the driving signal through stray capacitance. Further, where the display device is driven by a pulse wave, there is a limit as to the period and duty ratio of the driving pulse signal. Where passive display devices responsive to light received from outside the device were utilized, limitations on display capacity were imposed by the light scattering of the liquid crystal.

SUMMARY OF THE INVENTION

Generally speaking, in accordance with the invention, a display device for an electronic calculator is provided including a liquid crystal cell having a common electrode and a segmented electrode, said segmented electrode being adapted, upon selective separate actuation, to provide a desired display. Diode means are connected through their respective cathodes to each segment of said segmented electrode. Condenser means may be connected between each of said segments of said segmented electrode and said common electrode.

At least one of the electrodes of said liquid crystal cell may incorporate a substance selected from the group including a transition metal, an alloy of a transition metal, an oxide of a transition metal, or an oxide of an alloy of a transition metal, which substance is adapted to combine hydrogen and oxygen in said liquid crystal into water by catalysis.

Said diode means may be formed integral with said segmented electrode, said segmented electrode being defined by an N-type base plate, a plurality of P-type diffusing layers deposited on said base plate in spaced relation, and a N-type diffusing layer deposited on each of said P-type diffusing layers so as to be out of engagement with said base plate and engaging said liquid crystal.

Said capacitor may be formed by portions of the lead terminals connected to said segmented and common electrode and may include a spacer having a high dielectric power factor inserted in said terminal portion.

Accordingly, it is an object of this invention to provide a display device using liquid crystals particularly adapted for electronic calculators and avoiding the defects of the known liquid crystal display devices.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 9 is a schematic diagram showing an embodiment of the display element according to the invention.

DESCRIPTION OF THE PREFERRED EMBODIMENTS

Figure 1:
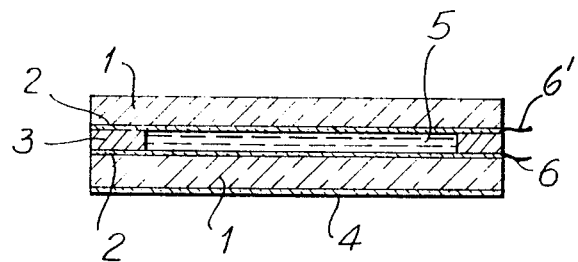
FIG. 1 is a cross-sectional view of one type of display cell using a liquid crystal.

Referring now to FIG. 1, the liquid crystal device depicted includes a pair of spaced glass plates 1, both of which are coated on their respective inner surfaces with a transparent conductive nesa film and are retained in spaced relation at their periphery by spacers 3. Retained within the spacers and plates is a liquid crystal substance 5. A mirror 4 is mounted on the outer surface of one of said plates, while the electrical connection to said nesa films is provided by leads 6 and 6'.

Figure 2:
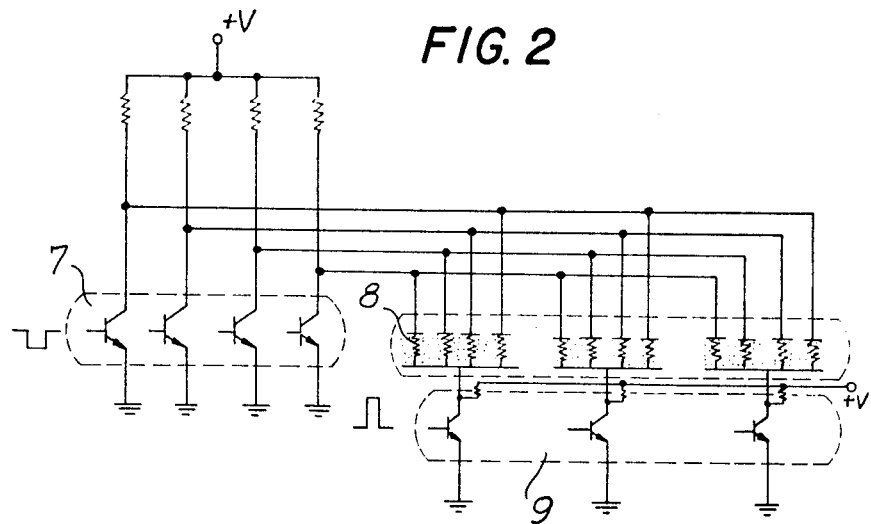
FIGS. 2 and 3 are circuit diagrams of various types of driving circuits for displays using liquid crystals.

A driving circuit for the liquid crystal device of FIG. 1 is shown in FIG. 2, wherein a plurality of driving transistors 7 are connected to that each driving transistor serves to apply a voltage to one of the four segments of each of the three columns defining the liquid crystal cell 8. Each of said columns are defined by a common electrode and a segmented electrode divided into four segments. Driving transistors 9 serve to selectively actuate the columns defining the liquid crystal cell. A principal defect in the arrangement of FIG. 2 is that when driving current is provided to one segment of one column of the liquid crystal cell, a by-pass current flows through the other segments of the liquid crystal cell so that the undesired other segments may also be faintly lit. Further, if the voltage applied to each segment is a pulse voltage, and the repetitive period of said voltage is larger than a pulse width, the segment will not light, even if the pulse voltage has a high peak value.

Figure 3:
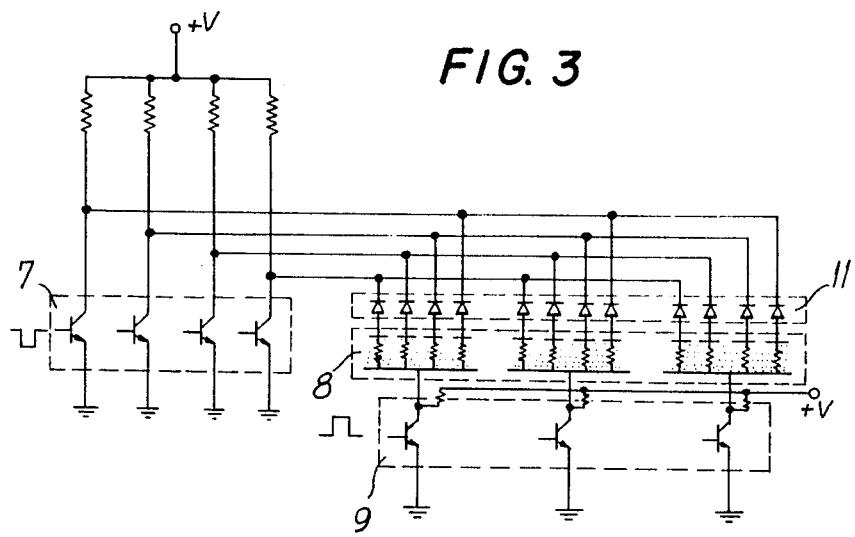

FIG. 3, shows the circuit of FIG. 2 modified by the addition of a plurality of diodes 11, one of which is connected to each segment of the segmented electrode of the liquid crystal cell 8. However, in the circuit of FIG. 3, the diodes 11 are connected with their anodes coupled to the segments of the segmented electrode of the liquid crystal cell. With this arrangement, the electric charge stored in the one segment of the cell to which the driving voltage is applied may discharge through the liquid crystal of other segments, causing said other segments to be faintly lit, a result which is sought to be avoided.

Figure 4:
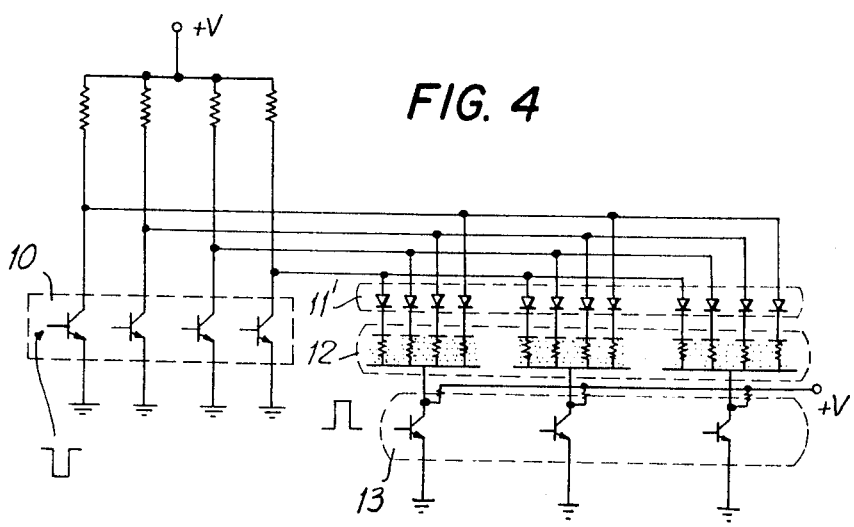
FIGS. 4 and 5 are circuit diagrams of driving circuits for displays according to the present invention.

It has been found that this defect can be avoided by the circuit of FIG. 4, wherein the driving transistors 10 apply the voltage to the segmented electrode of the liquid crystal cell 12 through diodes 11′, which diodes are connected to said segmented electrode at their respective cathodes. The driving transistors 13 serve to actuate the respective columns of the liquid crystal cell. With this arrangement, each segment of the liquid crystal cell is separated, and leakage from one cell to the other is avoided. In this manner, a sharp clear display is produced, since only the desired segments are lit. Further, electric charge is stored in the electrode of the segments which are not to be lit by diode 11, so that where display is to be achieved by scanning a pulse signal of a narrow width, the electrode is charged by the conductivity of liquid crystals during the period that the pulse voltage is applied, and during the interval for the next pulse, the charge is discharged through the resistance of the liquid crystals so that electric current always flows through the liquid crystal of the segments which are not to be lit, thereby avoiding the defect in known liquid crystal displays caused by the delay in response of the liquid crystal.

Figure 5:
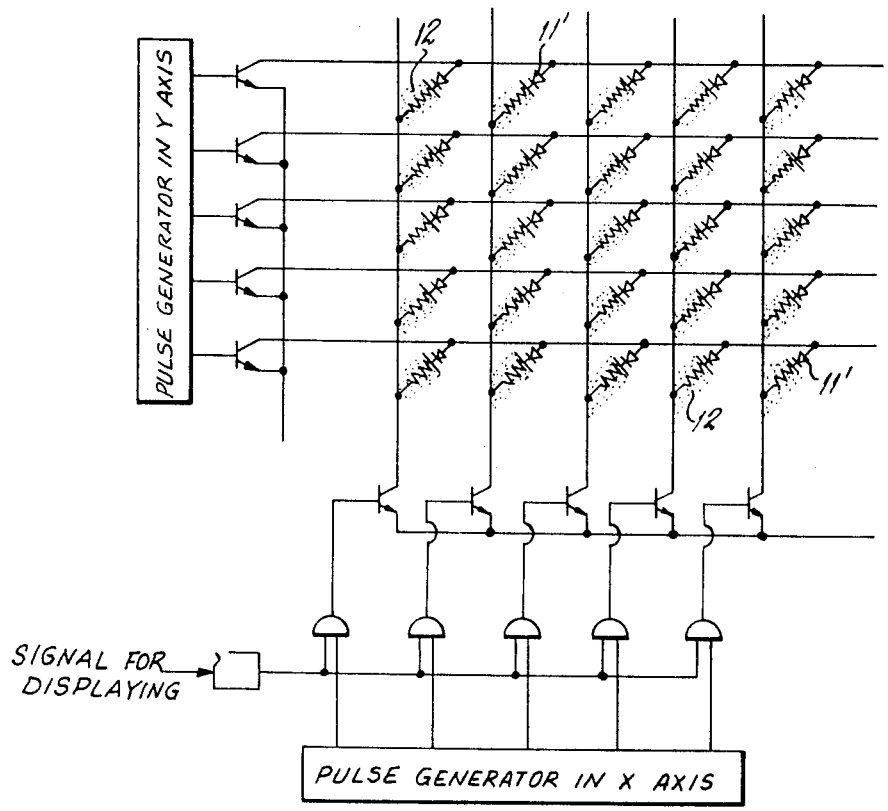

FIG. 5 shows an alternate driving circuit according to the invention, wherein the liquid crystal cell 12 is connected to a matrix driving circuit, each segment of the cell being connected to the Y-axis generating circuitry through a diode 11′.

Figure 6:
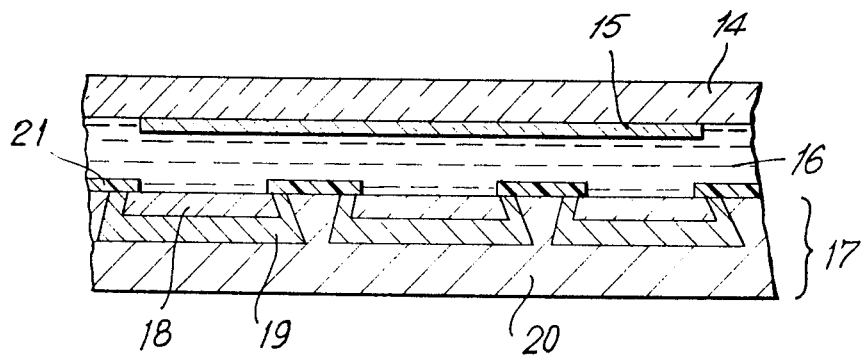
FIG. 6 is a fractional cross-sectional view of a display cell using a liquid crystal according to the invention.

Referring now to FIG. 6, we find a cross-sectional view of a liquid crystal cell wherein the diode associated with each segment is formed integral with the cell. In said cell, transparent glass plate 14 has a transparent thin-film electrode deposited thereon to serve as a common electrode. A liquid crystal substance 16 is retained between glass plate 14 and electrode plate 17 incorporating the diode means. Electrode plate 17 consists of a base plate 20 formed of N-type silicon. Deposited in spaced grooves in said base plate are P-type diffusing layers 19, which are also each formed with a groove for receiving a N-type diffusing layer 18. As seen in FIG. 6, the P-type diffusing layer 19 separates the N-type diffusing layer 18 from the base plate 20. A protecting film 21 formed from material such as $SiO_2$, $SiN_4$, or $AlO_3$ is provided to insulate the surface of the P-type diffusing layer 19 and the base plate from the liquid crystal substance 16, said liquid crystal substance being in contact with the N-type diffusing layer. When the N-type silicon base plate 20 is connected to the maximum potential in the circuit, each P – N connection is insulated from the others, to define the desired diode structure.

Figure 7:
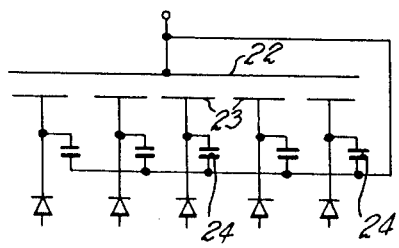
FIG. 7 is a circuit diagram of one circuit according to the invention.
Figure 8:
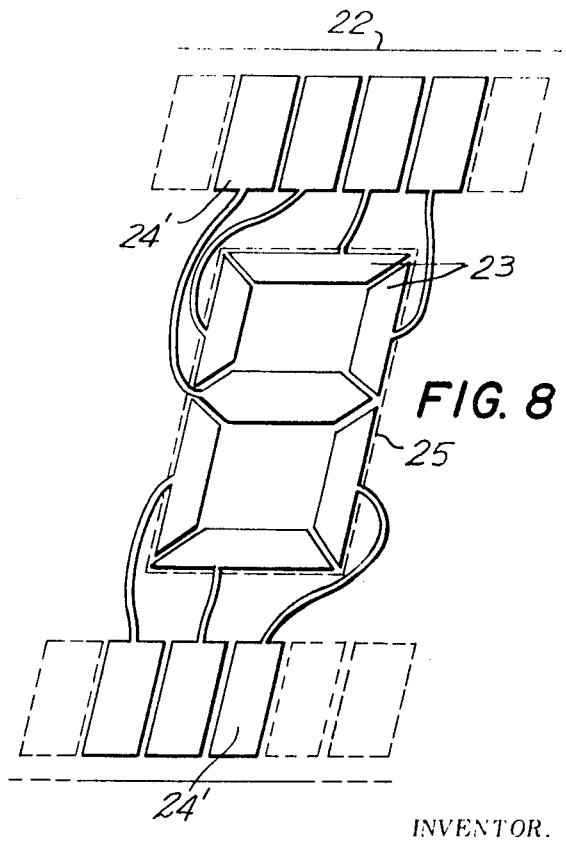
FIG. 8 is a schematic representation of the physical arrangement of the circuit of FIG. 7.

As discussed above, the defect in the prior art liquid crystal displays wherein such prior art displays fail to respond to pulse activation signals of certain characteristics is generally eliminated by the provision of the diode according to the invention. However, if the area of each segment of the segmented electrode of the liquid crystal cell is very small, so that the electric charge of the electrode is minimum and the electric charge discharged by the back current of the diode cannot be disregarded, the desired segment of the liquid crystal will not light sufficiently. However, in such a case, by connecting a capacitor in parellel with each segment, the electric charge required for obtaining a sufficient scattering ratio will be obtained. An embodiment incorporating such a capacitance is shown in the circuit diagram of FIG. 7 and in the schematic representation of FIG. 8. Referring to said figures, the capacitors 24 are connected between the common electrode 22 and the segments 23 of the segmented electrode, so that the capacitance between electrodes 22 and 23 is substantially increased. As shown in FIG. 8, capacitors 24 are positioned at the terminal region of the liquid crystal cell and are defined by lead regions 24′ and common electrode 22. A spacer of a particularly high dielectric material is preferably positioned in the terminal portion to serve as the dielectric for said capacitors and as a structural support for the circuitry. Dashed line 25 represents an opening in the spacer which receives the liquid crystal material.

A further deficiency in the known liquid crystal arrangements results from the electrolysis of moisture included in the liquid crystal by the direct current voltage. The gases produced by such electrolysis result in the deterioration of the liquid crystal, thereby minimizing the life of said liquid crystal. However, this defect is avoided where one of the electrodes in contact with the liquid crystal substance uses transition metals such as palladium, platinum, nickel, rhodium, iridium, cobalt or other transition metals, alloys of transition metals, oxides of transition metals, or oxides of alloys of transition metals, as an electrode in place of one of the transparent conductive nesa (tin oxide) electrodes described in connection with FIG. 1. The special electrode material according to the invention serves as a catalyst to rejoin the oxygen and hydrogen formed by electrolysis of the water by the operation of catalysis.

The liquid crystal displays according to the invention function as passive elements, and cannot operate unless sufficient light is applied to the liquid crystal from an outside source. In other words, the light scattering effect caused by the application of voltage to the liquid crystal is only effective as a display in the presence of an outside source of light. Thus, separate light sources are frequently provided, but such separate light sources require additional electric power which is usually not available where the liquid crystal is to be incorporated into a display for a portable electric calculator. In order to avoid the necessity of a separate light source, a mirror or half mirror is provided at the back of the liquid crystal and the liquid crystal cell is lighted from the front. In order to eliminate the unnecessary reflection of light by the mirror to the eyes of the observer, light which would otherwise be reflected in the direction of the eyes of the user from the mirror should be blocked by a black colored substance.

In conventional types of electronic calculators, eight to sixteen columns of numerals are generally provided, each column generally being provided in a single display tube. This arrangement results in high cost for wiring and assembly, and provides substantial opportunities for errors in wiring. As more particularly shown in FIG. 9, the liquid crystal display according to the invention permits the mounting of all of the columns of a display in a single display plate, thereby substantially reducing the cost of assembly of the display. In the display of FIG. 9, each column represents a single numerical digit, the numerals zero – nine being displayed by each column through the use of a 7-bar display, wherein selective actuation of groups of the 7-bars results in the display of every number from zero – nine. In FIG. 9, a transparent glass plate 26 faces the observer of the display and is positioned in spaced relation to a glass plate 27. A mirror-type thin film is deposited on the back of glass plate 27 to provide a reflective surface. The segmented electrode 28 defines the 7-bar display and is formed on the inner surface of plate 26 adjacent the liquid crystal material received intermediate plates 26 and 27. A common electrode 29 common to each of the segments of a single column is deposited on the inner surface of glass plate 27 adjacent said liquid crystal. Lead wire 30 is connected to segments 28 for applying an electric field to said segments, said lead wire also being formed by etching away portions of a transparent film deposited on the inner surface of glass plate 26. Connecting terminals 31 are provided for applying the electric field from the driving circuit to the segments of the segmented electrode. Since there are seven segments per column, and eight columns, 56 of said connecting terminals are provided.

A lead wire 32 is provided for applying the electric field to the common electrode 29, which wire line is also formed during the etching of the transparent film deposited on the glass plate 27. 33 are connecting terminals for applying the electric field from the driving circuit of the liquid crystal to the common electrodes of each column, there being one such terminal for each column, eight in all in the embodiment of FIG. 9. The oblique lined portion shown in FIG. 9 is an insulated spacer 34 formed from a plastic film of $1\mu \sim 12\mu$ in thickness. Said spacer serves to contain the liquid crystal material between plates 26 and 27, and to insulate lead wires 30 from lead wires 33. Where the driving circuit according to the invention is utilized, only the portions of the common electrode and the segments of the numerals to which an electric field is actually applied produce the light scattering effect, so that the numerals can be displayed.

The arrangement of FIG. 9 could equally be applied if sixteen columns were required, said arrangement being particularly advantageous for wiring and assembly of the display device in a calculating unit. Such an arrangement produces high reliability at low cost.

A display device utilizing thin liquid crystal films according to the invention may be used as the display device of an electronic calculator, and when so used, extremely favorable responses can be obtained. Thus, depending on the type of liquid crystal used, an extremely fast fall time of less than 30 m sec. can be obtained, and the response of the display element using liquid crystals can be improved by adjusting the thickness of the liquid crystal film and the strength of the electric field being applied thereto.

In this manner, the advantages of the liquid crystal itself can be most favorably employed and a compact, light in weight display device can be obtained.

It will thus be seen that the objects set forth above, and those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A display device for an electronic calculator comprising a liquid crystal cell having a first base plate; a first common electrode on said first base plate; a second base plate; a second segmented electrode on said second base plate and liquid crystal material therebetween, the segments of said segmented electrode being separately connected for selective actuation to define the desired display; and diode means associated with each segment of said segmented electrode, the cathode of each said diode means comprising the corresponding segment of said segmented electrode of said second base plate so that the cathode of each of said diode means engages said liquid crystal material, said diode means and segmented electrode including a base plate formed from N-type silicon and at least in part defining said second base plate; a plurality of P-type diffusing layers deposited in spaced relation on the surface of said base plate, an N-type diffusing layer deposited on each of said P-type diffusing layers to define said segments, said N-type diffusing layer being separated from said base plate by said P-type diffusing layer, and an insulating layer separating said liquid crystal material and the surface area of said base plate formed by said P-type diffusing layer.

2. A display device as recited in claim 1, wherein said liquid crystal material generates hydrogen and oxygen upon the application of a direct current voltage thereto and at least one of said first and second electrodes incorporates, in contact with said liquid crystal material, a substance selected from the group consisting of transition metals, alloys of transition metals, oxides of transition metals and oxides of alloys of transition metals, whereby the hydrogen and oxygen formed in said liquid crystal material can be combined into water by the catalytic action of said one electrode.

3. A display device as recited in claim 1, wherein said segments of said segmented electrode define a 7-bar numerical display.

4. A display device for an electronic calculator comprising a liquid crystal cell having a pair of spaced transparent plates; a spacer member intermediate said plates and defining a chamber therebetween; a liquid crystal substance retained in said chamber between said transparent plates by said spacer member; at least one common electrode mounted on the inner surface of a first of said plates in engagement with said liquid crystal substance, at least one segmented electrode mounted on the inner surface of a second of said plates in facing relation to said common electrode and in engagement with said liquid crystal substance, said segmented electrode being formed into a plurality of segments adapted for selective separate energization to define the desired display; lead means of chosen transverse dimension in the region of said spacer member extending along the inner surface of said second plate from each of said segments of said segmented electrode to the periphery of said second plate; conductive means extending along the inner surface of said first plate from said common electrode and in overlapping relation with a chosen area of each of said lead means in the region of said spacer member, said spacer member being formed of a material of chosen high dielectric constant to define parallel plate capacitive means of predetermined value with the respective overlapping portions of the lead means and said conductive means also overlapping said spacer means; and diode means connected through its cathode to each segment of said segmented electrode.

5. A display device as recited in claim 4, wherein said diode means is formed integral with each of said segments of said segmenting electrode.

6. A display device as recited in claim 4, wherein said liquid crystal material generates hydrogen and oxygen upon the application of a direct current voltage thereto and at least one of said first and second electrodes incorporates a substance selected from the group consisting of transition metals, alloys of transition metals, oxides of transition metals, and oxides of alloys of transition metals, whereby the oxygen and hydrogen in said liquid crystal substance is combined into water by the catalytic action of said one electrode.

7. A display device as recited in claim 4, wherein said segment of said segmented electrode are positioned to define a 7-bar numerical display, said liquid crystal cell including a plurality of said segmented and common electrode for defining a multi-digit numerical display.

8. A display device as recited in claim 1, including lead means extending along the inner surface of each of said first and second base plates from said common electrode and from each of said segments of said segmented electrode respectively; and a spacer member intermediate said base plates and defining a chamber therebetween for retaining the liquid crystal substance, said spacer member being formed of a high dielectric material to define parallel plate capacitive means with the respective lead means extending from each of said segments of said segmented electrode and said common electrode.

* * * * *